METHOD OF PREPARING A SOURDOUGH PANCAKE BATTER

Filed Feb. 12, 1954

|  | PARTS BY WEIGHT |
|---|---|
| FLOUR | 20 - 50 |
| MILK SOLIDS | 5 - 10 |
| WATER | 35 - 70 |

INOCULATE WITH:

(1) A BACTERIAL SPECIES OF THE GENUS LACTOBACILLUS AND/OR THE NON-PATHOGENIC LACTIC GROUP OF THE GENUS STREPTOCOCCUS AND WITH (2) A YEAST SPECIES OF THE GENUS SACCHAROMYCES AND/OR TORULOPSIS

FERMENT AT 15-45°C. UNTIL A pH OF FROM 3-6 HAS BEEN REACHED

MIX IN:

| EGGS (DRY BASIS) | 0.3 - 3 PARTS BY WEIGHT |
| SUGAR AND SALT | FLAVORING QUANTITIES |

FREEZE

FROZEN PANCAKE BATTER

*INVENTORS*
THOMAS H. WILLIAMS
and
BY DONALD P. MacLEAN

Eugene D. Farley
Atty.

United States Patent Office 2,857,280
Patented Oct. 21, 1958

2,857,280

METHOD OF PREPARING A SOURDOUGH PANCAKE BATTER

Thomas H. Williams and Donald P. MacLean, Seattle, Wash.

Application February 12, 1954, Serial No. 409,861

7 Claims. (Cl. 99—92)

This invention pertains to frozen pancake batter and to a process of making it.

Sourdough pancakes long have been a favorite culinary item. However, their preparation has been attended by many difficulties. The starter becomes contaminated with wild yeast so that the flavor and texture of the pancakes deteriorate with time. The starter may become contaminated with pathogenic organisms and become a source of infection. The starter may become contaminated with a bacteriophage and destroyed so that it no longer is active. Furthermore the domestic production of sourdough pancakes is a relatively tedious and time consuming procedure and the product inherently tends to be soggy and of poor texture.

Accordingly it is the general object of the present invention to provide pancake batter which overcomes the foregoing and other defects of sourdough pancake batters and which, moreover, may be produced commercially, distributed and sold in retail stores as a frozen product.

The manner in which the foregoing and other objects of this invention are accomplished will be apparent from the accompanying specification and claims, considered together with the single figure of the drawing, consisting of a flow plan of the presently described process.

As is apparent from the flow plan, the process of the present invention broadly comprises forming a mixture of flour, milk solids and water in stipulated proportions. This mixture then is inoculated with a bacterial species of the genus lactobacillus and/or the non-pathogenic Lactic group of the genus Streptococcus, and with a yeast species of the genus Saccharomyces and/or the genus Torulopsis. The combined use of these two types of microorganisms is critical to the success of the presently described procedure since they coact to produce a tangy, appetizing flavor in the final pancake product which neither one of the organisms produces when used alone.

After inoculation the mixture is fermented at 15–45° C. until a pH of from 3 to 6 has been reached. These conditions also are critical to the success of the present procedure since if they are exceeded a satisfactory fermentation does not occur, the microorganisms either being inactivated, or destroyed, or side reaction occurring which make the product deficient in flavor or texture.

After the fermentation has been completed, the mixture is combined with suitable proportions of eggs and flavoring material such as salt and sugar. It then may be frozen immediately and packaged, after which it may be kept indefinitely for distribution and sale.

When the housewife wishes to prepare pancakes from the mixture, she first thaws it and brings it to room temperature. She then mixes in some baking soda, after which the pancakes are ready for cooking. It thus is to be noted particularly that the leavening of the pancakes is accomplished, not by the action of the yeast added in the first instance, but solely by the action of the baking soda added just prior to cooking.

Considering the foregoing in greater detail:

Although the medium forming the base of the presently described batter is somewhat variable, it comprises in general flour, milk solids and water combined in the proportions given in Table I.

Table I

| | Parts by weight |
|---|---|
| Flour | 20 to 50 |
| Milk solids | 5 to 10 |
| Water | 35 to 70 |

The foregoing basic medium may be modified, however, to overcome the sogginess and poor texture which concededly has been a deficiency of sourdough pancakes throughout the years and which may be caused by bacterial decomposition of most of the gluten content of the mixture. Whatever the cause, we have discovered that the difficulty may be overcome effectively by incorporating a sufficient proportion of whole wheat flour in the mix. Thus, the basic medium from which a preferred batter may be prepared is given in Table II.

Table II

| | Parts by weight |
|---|---|
| Whole wheat flour | 5 to 13 |
| White wheat flour | 15 to 37 |
| Milk solids | 5 to 10 |
| Water | 35 to 70 |

A specific preferred formulation is given in Table III.

Table III

| | Parts by weight |
|---|---|
| Whole wheat flour | 7 to 9 |
| White wheat flour | 24 to 26 |
| Milk solids | 6 to 8 |
| Water | 46 to 50 |

The foregoing constituents are thoroughly mixed together and then inoculated with the specific microorganisms which we have found to be effective in producing the pleasant and unique flavor characterizing pancakes made from the presently described batter. These microorganisms comprise broadly members of the genus Lactobaccillus and/or the non-pathogenic Lactic group of the genus Streptococcus as a first class, and a yeast species of the genus Saccharomyces and/or Torulopsis as a second class. Any species of the above microorganisms may be employed, and, if desired, the various strains may be mixed. Preferred species are *Streptococcus lactis* and *Saccharomyces minutiae*.

The inoculation of the medium may be accomplished at room temperature by any conventional procedure, as by introducing into it from 0.5 to 5.0 parts of a 24 hour culture of each strain of microorganism employed.

The inoculated mixture then is fermented under conditions calculated to promote the growth of the selected microorganisms which thereupon through their associated action generate the flavor components which are responsible for the superior flavor of the presently described product. Accordingly, the fermentation is effectuated at a temperature of from 15 to 45° C., preferably from 24 to 32° C. At temperatures below 15° C. the microorganisms are not sufficiently active to produce the desired results in a practical incubation period. At temperatures above 45° C. the selected microorganisms may be killed, or the growth of wild strains unduly promoted.

The fermentation is carried out within the stipulated temperature range until the flavor components have been developed fully. This occurs when the pH of the mixture, which originally is about 6.5 reaches a value within the broad range of pH 3 to pH 6. For maximum development of the flavor components, however, the pH should be kept between a value of 3.7 to 4.5, preferably about 3.9.

Fermentation of the mixture to this pH is critical to the success of the operation, since if the broad limits are exceeded in either direction, a useful product is not obtained, and the final pH value must be maintained within the preferred limits if the maximum development of flavor is assured. Although the time required to achieve this final pH is variable depending upon such factors as the composition of the medium and the incubation temperature, an overall period of from 8 to 48 hours, preferably from 10 to 30 hours, usually is sufficient to accomplish the desired result.

After the fermentation is complete, other components are added to impart body, nutritive value, and flavor qualities to the mixture. Thus eggs used in quantity of from 0.3 to 3.0 parts, dry solids basis, may be included. Also, flavoring quantities of sugar and salt may be added. Still further, if it is not desired to include whole wheat flour in the medium, from 3 to 15 parts of white wheat flour may be added at this stage of the processing for texture improvement. This will achieve a similar result, namely an improvement of texture and elimination of sogginess of the final pancake.

The aforementioned flavoring and bodying components are thoroughly blended into the fermented mixture after which the resulting batter is frozen substantially immediately to avoid further bacterial action. The mixture thus is subjected to a quick freeze and thereafter brought to a storage temperature in the usual manner. It may be kept indefinitely at such temperature and hence may be distributed and sold in the usual retail channels.

Just prior to use, the batter is thawed out and from 0.3 to 2.0 parts by weight baking soda added. The baking soda is thoroughly blended into the mixture, the blending being continued until the mixture just starts to rise. The mixture then is ready for cooking, the baking soda serving as the sole leavening agent.

The resulting pancakes are characterized by a delightful tangy flavor developed by the action of the selected bacterial and yeast strains. Also, they are of superior texture, being light and tender in spite of their sourdough origin. These attributes are obtained, furthermore, while contemporaneously providing a batter suitable for freezing, storing, and retail distribution as a stock item of frozen foods.

Having now described our invention, what we claim as new and desire to protect by Letters Patent, is:

1. The process of making an unleavened pancake batter adapted to be frozen for storage and subsequently thawed and leavened for cooking, said process comprising preparing a mixture of from 20 to 50 parts flour, from 5 to 10 parts milk solids, and from 35 to 70 parts water, parts being expressed as parts by weight, inoculating the mixture with at least one bacterial species of the class consisting of the genus Lactobacillus and the non-pathogenic lactic group of the genus Streptococcus, and with at least one yeast species of the class consisting of the genus Saccharomyces and the genus Torulopsis; and fermenting the inoculated mixture at a temperature of from 15–45° C. until it has reached a pH of from 3 to 6.

2. The process of making an unleavened pancake batter adapted to be frozen for storage and subsequently thawed and leavened for cooking, said process comprising preparing a mixture of from 20 to 50 parts flour, from 5 to 10 parts milk solids, and from 35 to 70 parts water, parts being expressed as parts by weight, inoculating the mixture with at least one bacterial species of the class consisting of the genus Lactobacillus and the non-pathogenic lactic group of the genus Streptococcus, and with at least one yeast species of the class consisting of the genus Saccharomyces and the genus Torulopsis, and fermenting the inoculated mixture at a temperature of from 24–32° C. until it has reached a pH of from 3.7 to 4.5.

3. The process of making an unleavened pancake batter adapted to be frozen for storage and subsequently thawed and leavened for cooking, said process comprising preparing a mixture of from 5 to 13 parts whole wheat flour, from 15 to 37 parts white wheat flour, from 5 to 10 parts milk solids and from 35 to 70 parts water, parts being expressed as parts by weight, inoculating the mixture with at least one bacterial species of the class consisting of the genus Lactobacillus and the non-pathogenic lactic group of the genus Streptococcus, and with at least one yeast species of the class consisting of the genus Saccharomyces and the genus Torulopsis, and fermenting the inoculated mixture at a temperature of from 15–45° C. until it has reached a pH of from 3 to 6.

4. The process of making an unleavened pancake batter adapted to be frozen for storage and subsequently thawed and leavened for cooking, said process comprising preparing a mixture of from 5 to 13 parts whole wheat flour, from 15 to 37 parts white wheat flour, from 5 to 10 parts milk solids and from 35 to 70 parts water, parts being expressed as parts by weight, inoculating the mxiture with at least one bacterial species of the class consisting of the genus Lactobacillus and the non-pathogenic lactic group of the genus Streptococcus, and with at least one yeast species of the class consisting of the genus Saccharomyces and the genus Torulopsis, and fermenting the inoculated mixture at a temperature of from 24–32° C. until it has reached a pH of from 3.7 to 4.5.

5. The process of making an unleavened pancake batter adapted to be frozen for storage and subsequently thawed and leavened for cooking, said process comprising preparing a mixture of from 20 to 50 parts flour, from 5 to 10 parts milk solids, and from 35 to 70 parts water, inoculating the mixture with at least one bacterial species of the class consisting of the genus Lactobacillus and the non-pathogenic lactic group of the genus Streptococcus, and with at least one yeast species of the class consisting of the genus Saccharomyces and the genus Torulopsis, fermenting the inoculated mixture at a temperature of from 15–45° C. until it reaches a pH of from 3 to 6, and admixing with the fermented mixture from 3 to 15 parts unfermented white flour and from 0.3 to 3 parts eggs (dry basis), parts being expressed as parts by weight.

6. The process of making an unleavened pancake batter adapted to be frozen for storage and subsequently thawed and leavened for cooking, said process comprising preparing a mixture of from 20 to 50 parts flour, from 5 to 10 parts milk solids, and from 35 to 70 parts water, parts being expressed as parts by weight, inoculating the mixture with *Streptococcus lactis* and *Saccharomyces minutiae*, and fermenting the inoculated mixture at a temperature of from 15–45° C. until it has reached a pH of from 3 to 6.

7. The process of claim 6 wherein the inoculated mixture is fermented to a pH of from 3.7 to 4.5.

References Cited in the file of this patent

UNITED STATES PATENTS

| | | |
|---|---|---|
| 1,894,135 | Torok et al. | Jan. 10, 1933 |
| 2,023,500 | Wogerbauer | Dec. 10, 1935 |

OTHER REFERENCES

"Milk," by Heineman, W. B. Saunders, Philadelphia and London, 1919, page 265.

"White House Cook Book," by Ziemann et al. The Saalfield Publishing Company, Akron, Ohio, 1929, page 305.

"Frozen Batters and Doughs," Journal of Home Economics, June 1940, pages 381 and 382.

"The Gourmet Cookbook," 1950, published by Gourmet Publ. Corp. (N. Y.), page 52.